United States Patent [19]
Levine et al.

[11] Patent Number: 5,987,598
[45] Date of Patent: Nov. 16, 1999

[54] METHOD AND SYSTEM FOR TRACKING INSTRUCTION PROGRESS WITHIN A DATA PROCESSING SYSTEM

[75] Inventors: Frank Eliot Levine; Charles Philip Roth; Edward Hugh Welbon, all of Austin, Tex.

[73] Assignee: International Business Machines Corporation, Armonk, N.Y.

[21] Appl. No.: 08/888,798

[22] Filed: Jul. 7, 1997

[51] Int. Cl.[6] .................................................. G06F 11/00
[52] U.S. Cl. ............................................................ 712/227
[58] Field of Search ............................................. 712/227

[56] References Cited

U.S. PATENT DOCUMENTS

| | | | |
|---|---|---|---|
| 5,481,683 | 1/1996 | Karim | 712/217 |
| 5,594,864 | 1/1997 | Trauden | 712/227 |
| 5,659,679 | 8/1997 | Alpert et al. | 712/227 |
| 5,675,749 | 10/1997 | Hartvigsen et al. | 712/227 |
| 5,751,985 | 5/1998 | Shen et al. | 712/218 |
| 5,774,685 | 6/1998 | Dudey | 712/205 |
| 5,832,511 | 11/1998 | Beck et al. | 707/201 |

*Primary Examiner*—William M. Treat
*Attorney, Agent, or Firm*—Casimer K. Salys; Brian F. Russell; Andrew J. Dillon

[57] ABSTRACT

A processor and method for tracking instruction execution within a processor are described. The processor includes at least one execution unit that executes instructions and an instruction status indicator that dynamically indicates a status of an instruction during processing. The instruction status indicator has at least a first state to which the instruction status indicator is set in order to indicate that execution of the instruction is stalled. In one embodiment, the processor further includes a reason code indicator associated with the instruction status indicator that specifies an event occurrence that caused the indicated instruction status. In another embodiment, the processor further includes a history buffer that indicates the number of processor cycles that the status indicated by the instruction status indicator has remained unchanged.

21 Claims, 4 Drawing Sheets

METHOD AND SYSTEM FOR TRACKING INSTRUCTION PROGRESS WITHIN A DATA PROCESSING SYSTEM

BACKGROUND OF THE INVENTION

1. Technical Field

The present invention relates in general to a data processing system and, in particular, to a method and system for performance monitoring within a data processing system. Still more particularly, the present invention relates to a method and system for tracking the progress of instructions executed within a data processing system.

2. Description of the Related Art

Within a state-of-the-art processor, facilities are often provided that enable the processor to count occurrences of selected events and thereby obtain a quantitative description of the operation of a data processing system. These facilities are generally referred to as a performance monitor.

A conventional performance monitor includes at least one control register and one or more counters. The control register is typically comprised of a plurality of bit fields, which are set to specified values in order to select the events to be monitored and to specify the conditions under which the counters are enabled. Occurrences of the selected events can then be counted by the performance monitor counters.

Although a conventional performance monitor is useful for ascertaining information such as the frequency of occurrence of particular events and the average execution time of a particular class of instruction, the event counts provided by a conventional performance monitor do not give a comprehensive view of the effect of particular event occurrences upon instruction execution within the processor. In addition, it is frequently difficult to determine the cause of observed performance problems based only upon event counts.

Consequently, it would be desirable to provide an improved method and system for performance monitoring that supply additional information regarding the causes and effects of event occurrences within a data processing system. In particular, it would be desirable to provide an improved method and system for performance monitoring that track the progress of instruction execution within a data processing system.

SUMMARY OF THE INVENTION

It is therefore one object of the present invention to provide an improved data processing system.

It is another object of the present invention to provide a method and system for performance monitoring within a data processing system.

It is yet another object of the present invention to provide a method and system for tracking the progress of instructions executed within a data processing system.

The foregoing objects are achieved as is now described. A processor and method for tracking instruction execution within a processor are provided. The processor includes at least one execution unit that executes instructions and an instruction status indicator that dynamically indicates a status of an instruction during processing. The instruction status indicator has at least a first state to which the instruction status indicator is set in order to indicate that execution of the instruction is stalled. In one embodiment, the processor further includes a reason code indicator associated with the instruction status indicator that specifies an event occurrence that caused the indicated instruction status. In another embodiment, the processor further includes a history buffer that indicates the number of processor cycles that the status indicated by the instruction status indicator has remained unchanged.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
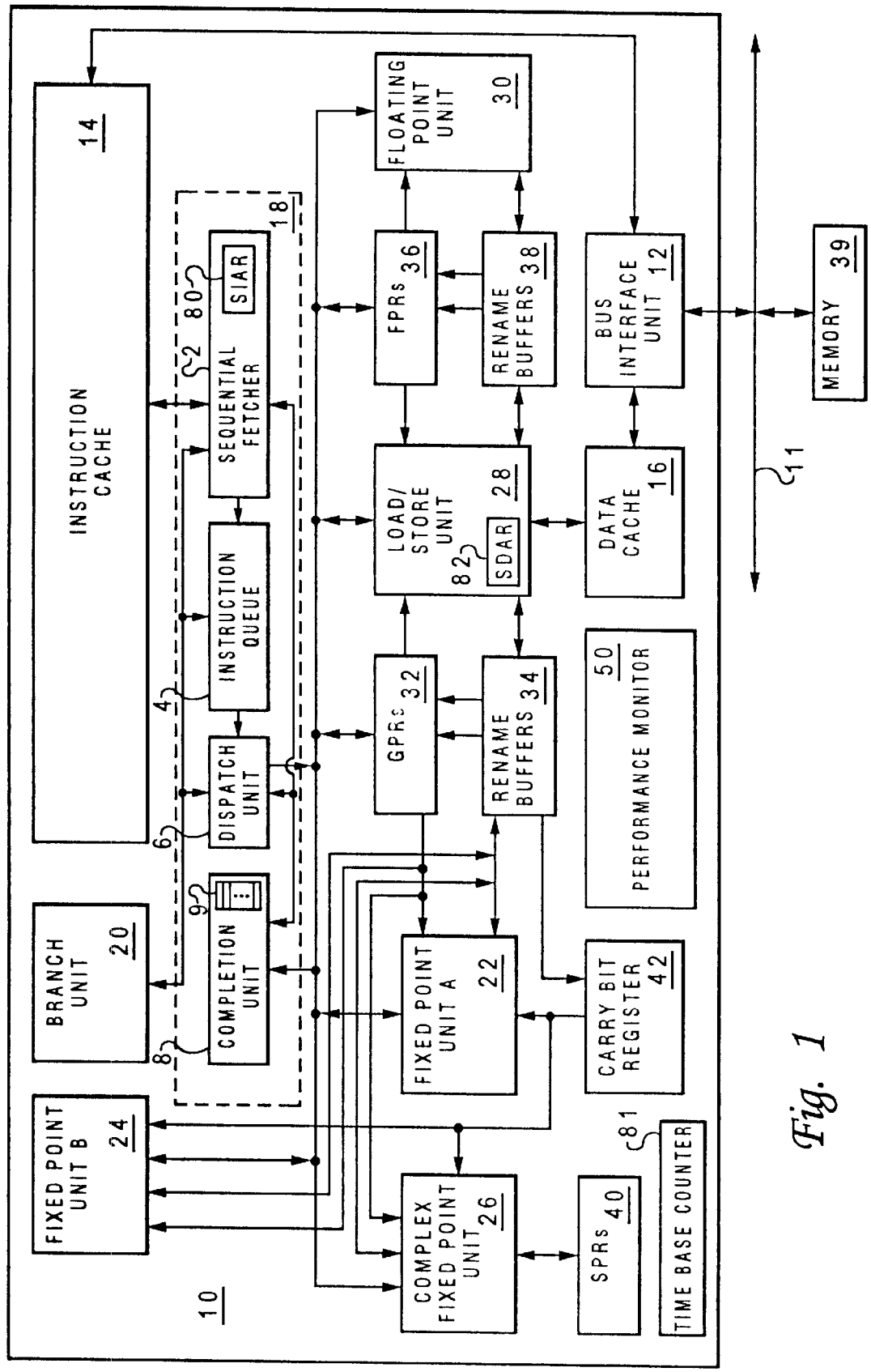
FIG. 1 depicts an illustrative embodiment of a data processing system with which the method and system of the present invention may advantageously be utilized.

With reference now to the figures and in particular with reference to FIG. 1, there is depicted a block diagram of an illustrative embodiment of a processor, indicated generally at 10, in accordance with the invention recited within the appended claims. In the depicted illustrative embodiment, processor 10 comprises a single integrated circuit pipelined superscalar microprocessor. Accordingly, as discussed further below, processor 10 includes various execution units, registers, buffers, memories, and other functional units, which are all formed from integrated circuitry. Processor 10 preferably comprises one of the PowerPC™ line of microprocessors available from IBM Microelectronics (e.g., the PowerPC™ 604), which operate according to reduced instruction set computing (RISC) techniques. Details concerning the architecture and operation of the PowerPC™ 604 processor may be found in the *PowerPC™ 604 RISC Microprocessor User's Manual* (available from IBM Microelectronics as Order No. MPR604UMU-01), which is incorporated herein by reference. Those skilled in the art should appreciate from the following description, however, that the present invention could alternatively be incorporated within other suitable processors.

As illustrated in FIG. 1, processor 10 is coupled to system bus 11 via bus interface unit (BIU) 12. BIU 12 controls the transfer of information between processor 10 and other devices (e.g., memory 39 or another processor) that are coupled to system bus 11 and that together with processor 10 and system bus 11 form a data processing system. BIU 12 is further connected to instruction cache 14 and data cache 16, which permit processor 10 to achieve relatively fast access times to a small set of local data and instructions stored within caches 14 and 16.

Instruction cache 14 is in turn connected to sequencer unit 18, which comprises sequential fetcher 2, instruction queue 4, dispatch unit 6, and completion unit 8. Sequential fetcher 2 fetches up to four instructions per cycle from instruction cache 14 and transmits the fetched instructions to both branch processing unit (BPU) 20 and instruction queue 4, which holds up to 8 instructions. Branch instructions are retained by BPU 20 for execution and are cancelled from instruction queue 4; sequential instructions, on the other hand, are cancelled from BPU 20 and temporarily buffered within instruction queue 4 for subsequent execution by sequential instruction execution circuitry within processor 10. Dispatch unit 6 dispatches up to four instructions per cycle from instruction queue 4 to the sequential instruction execution circuitry of processor 10 depending upon the availability of execution resources. One of the execution resources required for the dispatch of an instruction is an available entry in 16-entry reorder buffer 9 within completion unit 8. As described in greater detail below, reorder buffer 9 is utilized by completion unit 8 to retire instructions, which are opportunistically executed out of program order, according to program order.

In the depicted illustrative embodiment, the sequential instruction execution circuitry of processor 10 includes fixed-point unit A (FXUA) 22, fixed-point unit B (FXUB) 24, complex fixed-point unit (CFXU) 26, load/store unit (LSU) 28, and floating-point unit (FPU) 30. Each of these execution units is capable of executing one or more instructions of a particular class of instructions during each cycle. For example, FXUA 22 and FXUB 24 execute a first class of fixed-point instructions that perform mathematical and logical operations such as addition, subtraction, ANDing, ORing, and XORing; CFXU 26 executes a second class of fixed-point instructions that perform operations such as fixed-point multiplication and division; FPU 30 executes floating-point instructions that perform operations such as floating-point multiplication and division; LSU 28 executes load and store instructions; and branch unit 20 executes branch instructions.

Processor 10 achieves high performance by simultaneously processing multiple instructions at a number of pipeline stages within execution units 20–30. In this pipelined architecture, each instruction is processed in a sequence of stages, where processing at each stage is performed in parallel with the processing of other instructions at different stages. In the depicted illustrative embodiment, an instruction is normally processed at six stages: fetch, decode, dispatch, execute, completion, and writeback.

During the fetch stage, sequential fetcher 2 selectively fetches one or more instructions from one or more memory addresses within instruction cache 14. Each of the fetched instructions is then preferably associated with a unique instruction identifier (ID) by sequential fetcher 2. As described in detail below, the instruction IDs may be utilized in accordance with the present invention to track the progress of instructions through the execution pipeline of processor 10.

Thereafter, during the decode stage, branch unit 20 partially decodes instructions forwarded to it by sequential fetcher 2 in order to discriminate between sequential and branch instructions. In addition, an implementation-dependent number of the sequential instructions within instruction queue 4 are decoded in parallel by dispatch unit 6.

In the dispatch stage, dispatch unit 6 selectively dispatches up to four decoded instructions to appropriate ones of execution units 20–30 in program order after first reserving entries within rename buffers 34 and 38 for the dispatched instructions' results and reserving one entry in reorder buffer 9 for each dispatched instruction. During the dispatch stage, operands for the dispatched instructions are also supplied to the selected execution units. For example, FPU 30 can retrieve instruction operands from floating-point registers (FPRs) 36 and floating-point rename buffers 38. Fixed-point execution units 22, 24, and 26, on the other hand, can retrieve instruction operands from general purpose registers (GPRs) 32, fixed-point rename buffers 34, and carry bit register 42. CFXU 26 can also obtain instruction operands from special purpose registers (SPRs) 40 in response to receipt of MFSPR (move from SPR) instruction. LSU 28 retrieves data from a selected one of GPRs 32 and FPRs 36 in response to receipt of a STORE instruction and requests data operands from data cache 16 in response to receipt of a LOAD instruction from dispatch unit 6. If LOAD operand data requested by LSU 28 is not resident within data cache 16, the requested data is retrieved from memory 39 (or other external source) via BIU 12 and system bus 11.

In the execute stage, execution units 20–30 opportunistically execute their respective dispatched instructions as operands become available, thereby permitting instructions to be executed out-of-order relative to their program order. The execution results of most instructions are stored in the entry or entries within fixed-point rename buffers 34 and floating-point rename buffers 38 allocated to each instruction by sequencer unit 18. In addition, CFXU 26 stores the execution results of MTSPR (move to SPR) instructions in SPRs 40 or other SPRs in processor 10.

In the completion stage, completion unit 8 indicates that an instruction is complete when execution of the instruction is finished and preceding instructions have been completed or will be completed during the same cycle. Thereafter, during the writeback stage, completion unit 8 directs the copying of data from fixed-point rename buffers 23 to GPRs 22 or from floating-point rename buffers 26 to FPRs 25. It is during the writeback stage that processor 10 updates its architected state in response to the instruction being written back. Processor 10 processes the respective writeback stages of instructions according to program order and advantageously merges an instruction's completion and writeback stages in specified situations. In the illustrative embodiment, each instruction requires one machine cycle to complete each of the stages of instruction processing. Nevertheless, some instructions, such as complex fixed-point instructions, may require more than one cycle. Accordingly, a variable delay may occur between a particular instruction's execution and completion stages in response to the variation in time required for completion of preceding instructions.

Still referring to FIG. 1, the hereinbefore described operation of processor 10 can be monitored utilizing performance monitor 50, which in the illustrative embodiment is a software-accessible mechanism capable of providing detailed information descriptive of the utilization of instruction execution resources and storage control. Although not illustrated in FIG. 1, performance monitor 50 is coupled to each functional unit of processor 10 in order to permit the monitoring of all aspects of the operation of processor 10, including reconstructing the relationship between events, identifying false triggering, identifying performance bottlenecks, monitoring pipeline stalls, monitoring idle cycles, determining dispatch efficiency, determining branch efficiency, determining the performance penalty of misaligned data accesses, identifying the frequency of execution of serialization instructions, identifying inhibited interrupts, and determining performance efficiency.

Figure 2:
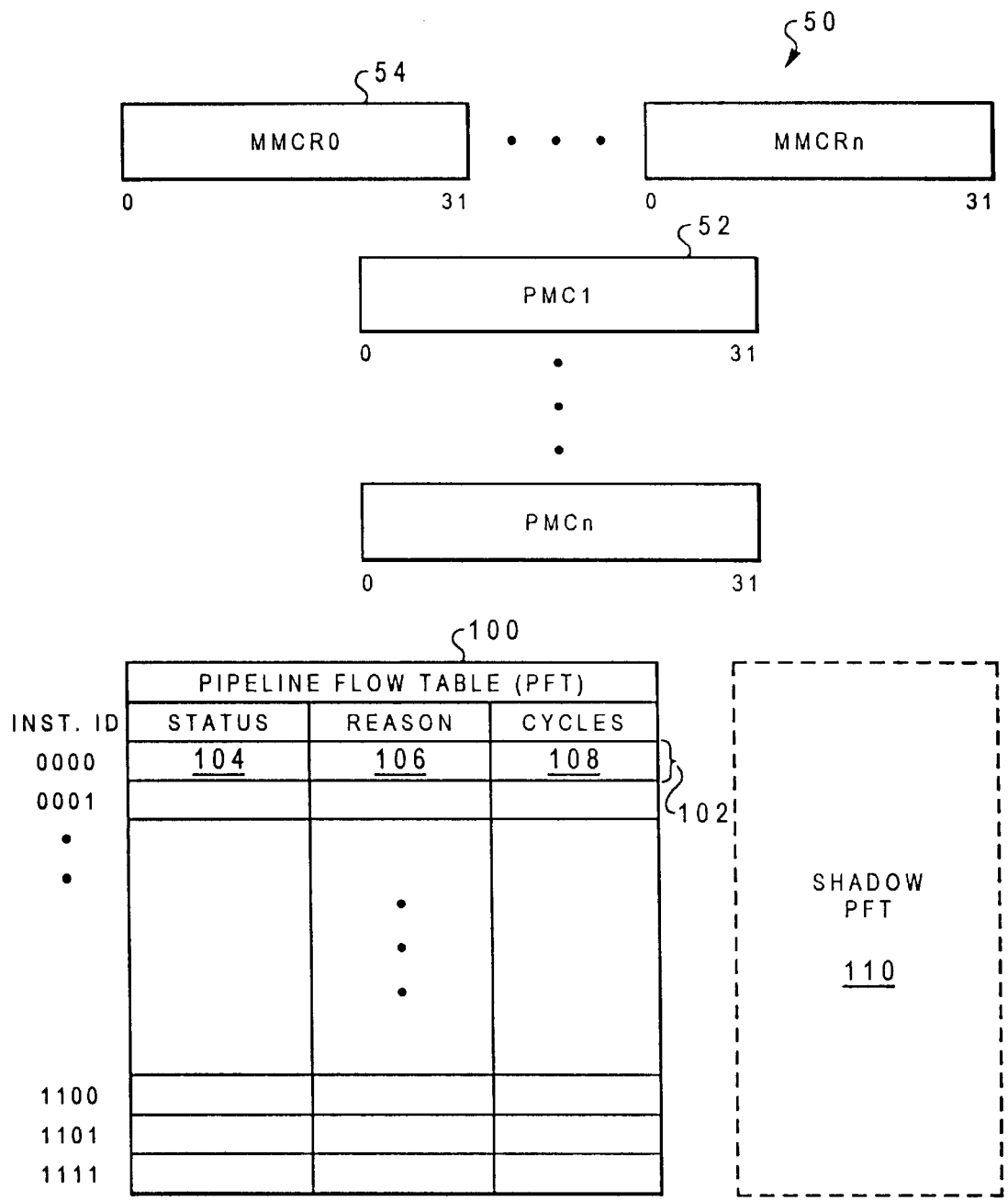
FIG. 2 is a high level block diagram of the performance monitor of FIG. 1, which includes a Pipeline Flow Table (PFT) in accordance with the present invention.

Referring now to FIG. 2, there is depicted a more detailed block diagram of the principal components of performance monitor 50. As illustrated, performance monitor 50 includes an implementation-dependent number (e.g., 2–8) of event counters 52, labelled PMC1 through PMCn, which are utilized to count occurrences of selected events. Performance monitor 50 further includes one or more monitor mode control registers (MMCR0–MMCRn) 54 that specify the function of event counters 52. Event counters 52 and MMCR0–MMCRn 54 are preferably implemented as SPRs that are accessible for read or write via MFSPR (move from SPR) and MTSPR (move to SPR) instructions executable by CFXU 26. However, in an alternative embodiment, event counters 52 and MMCR0–MMCRn 54 may be implemented simply as addresses in I/O space.

Figure 3:
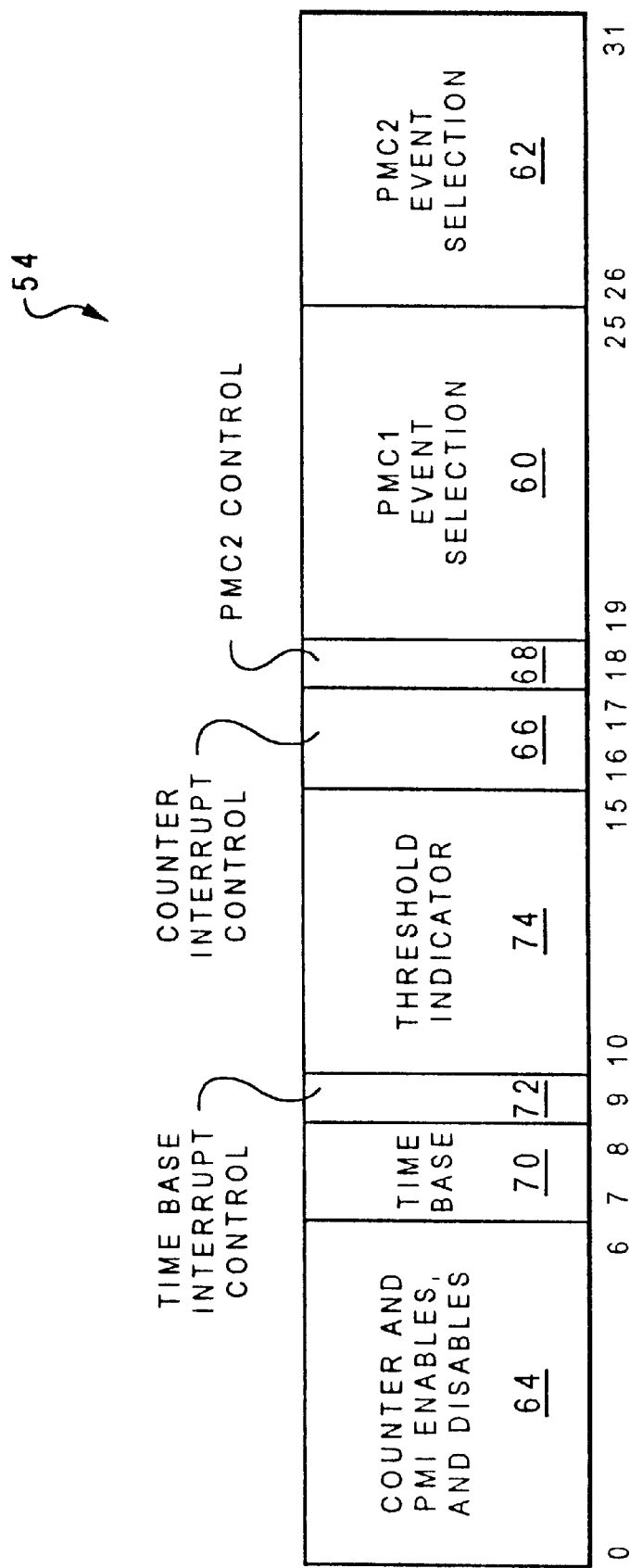
FIG. 3 illustrates an exemplary embodiment of a monitor mode control register (MMCR) within the performance monitor of FIG. 1.

With reference now to FIG. 3, there is illustrated an exemplary embodiment of MMCR0 54. As depicted, MMCR0 54 is a 32-bit register partitioned into a number of bit fields whose values control the operation of event counters 52. Bit fields 60 and 62 are utilized to select the events for which the associated event counters 52 count occurrences. Examples of permissible encodings of bit fields 60–62 and the events they select may be found at pages 9-4 and 9-5 of the *PowerPC™ 604 RISC Microprocessor User's Manual*. MMCR0 54 further includes bit field 64, which specifies the various conditions under which counting by event counters 52 is enabled or disabled and whether performance monitor interrupts (PMIs) are enabled or disabled. Bit field 66 specifies whether a PMI is generated when one of event counters 52 go negative. Bit field 68 specifies if counting by PMC2 52 is triggered in response to PMC1 52 becoming negative or a PMI being signaled. Bit fields 70 and 72 control the operation of time base counter 81 (illustrated in FIG. 1), which comprises a 64-bit counter utilized to time event occurrences in processor 10. Time base counter 81 preferably increments at a frequency based upon the system bus clock, for example, every four clock cycles. Bit field 70 in MMCR0 54 selects which of the 64 bits of time base counter 81 is to be utilized for monitoring, and bit field 72 specifies if a transition of the selected bit generates an interrupt. Time base counter 81 may be utilized, among other things, to synchronize processor operation in a multiprocessor data processing system so that all of the processors detect and react to a selected single system-wide event in a coordinated manner. Finally, MMCR0 56 includes a 6-bit threshold bit field 74, which specifies a threshold value utilized to identify event occurrences of interest.

Referring again to FIG. 2, in accordance with the present invention performance monitor 50 further includes pipeline flow table (PFT) 100, which is utilized to track the execution of instructions within processor 10. In the depicted illustrative embodiment, PFT 100 includes 16 entries 102, which are each associated with a respective one of the 16 available instruction IDs utilized to identify instructions within the pipeline of processor 10. Each entry 102, which is preferably implemented as a software-readable SPR, includes a status field 104 that specifies the status of the associated instruction on a cycle by cycle basis. The status is preferably indicated by a number of bits (e.g., 4 bits) that indicate the stage in the pipeline at which the instruction is currently being processed and whether processing has completed at the current pipeline stage, is continuing at the current pipeline stage, or has stalled at the current pipeline stage waiting for a resource. Of course, the number of possible instruction statuses and the bit value utilized to indicate each instruction status are implementation-dependent and may be selected based upon the available state machine signals within the processor. That is, because processor 10 is an implementation of a complex state machine comprising numerous states, where transitions between states in the state machine occur in response to predefined internal signals, the instruction status recorded in each status field 104 is preferably generated by simple logical combination of available processor state machine signals.

As illustrated, each entry 102 in PFT 100 preferably includes a reason field 106 that dynamically indicates a reason or cause of the instruction status specified by the associated status field 104. For example, the status field 104 of a particular entry 102 may indicate that processing of the associated instruction is stalled at the execution stage of the pipeline. Such a stall may be caused by a number of events, for example, a load miss in data cache 16 or a multiple-cycle floating-point divide. Thus, the bit pattern recorded in reason field 106 distinguishes between the possible causes of a particular instruction status. Like the instruction status indicator stored within status field 104, the reason indicator stored within reason field 106 is preferably generated by logically combining state machine signals available within processor 10.

Finally, each entry 102 in PFT 100 includes cycle field 108, which indicates the number of processor cycles that the associated instruction has been at the current stage of the pipeline. Thus, each cycle field 108 is in effect a small (e.g., 5 bit) counter that is incremented each processor cycle and is reset to zero in response to the associated status field 104 being updated to reflect the advancement of the instruction to the next pipeline stage. In an alternative embodiment, cycle field 108 can be implemented to count the total number of processor cycles that have elapsed since the instruction entered the pipeline of processor 10.

The above described monitoring capabilities of PFT 100 can advantageously be utilized in conjunction with the operation of event counters 52 by selecting a particular instruction status, reason code, or cycle field value as an event to be monitored by one of event counters 52. An example of the use of PFT 100 and event counters 52 to track the progress of instructions through the pipeline of processor 10 is illustrated in FIG. 4.

Figure 4:
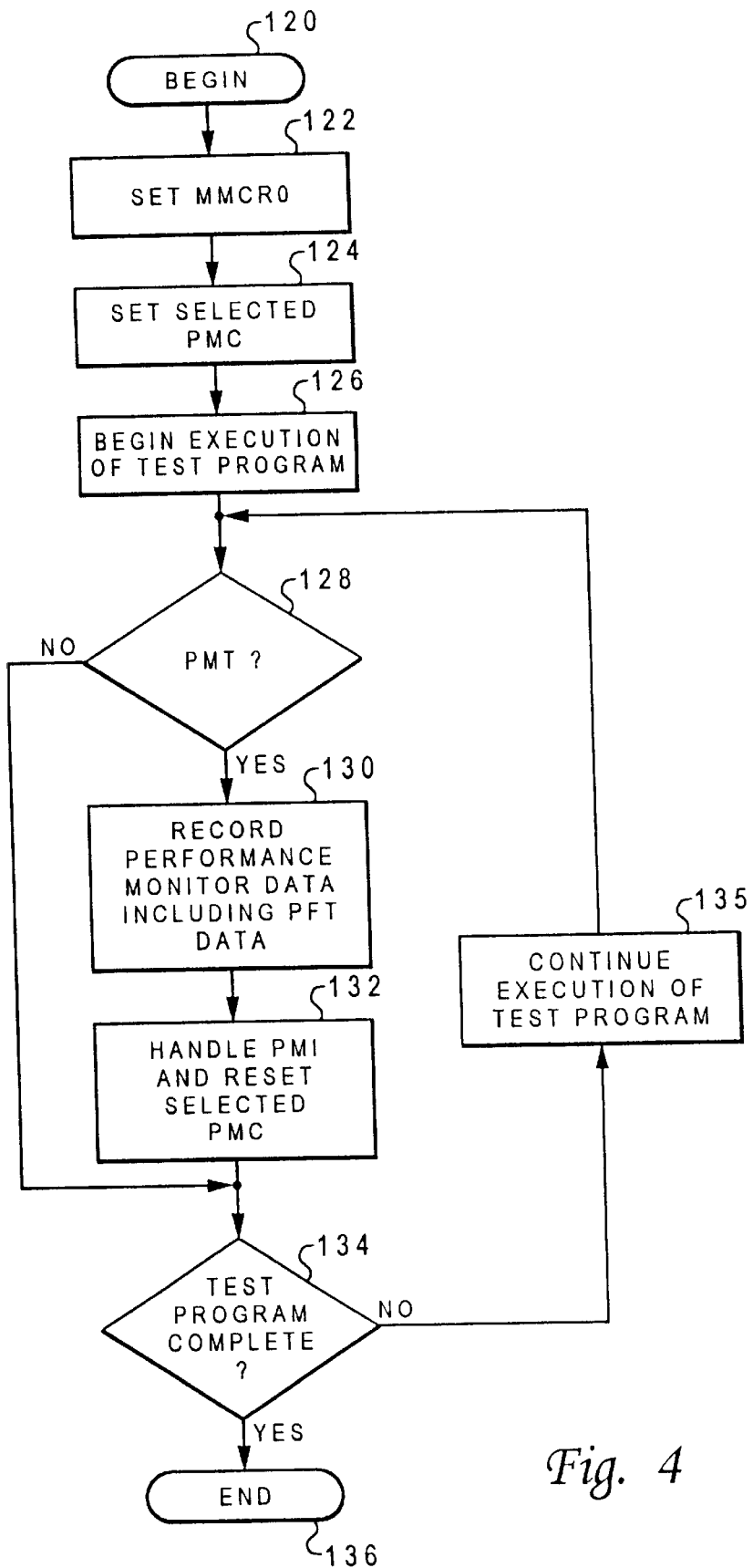
FIG. 4 depicts a logical flowchart of an illustrative embodiment of a method of tracking instruction progress in accordance with the present invention.

Referring now to FIG. 4, the process begins at block 120 and thereafter proceeds to block 122, which illustrates the execution of a MTSPR instruction in order to initialize MMCR0 54 to a selected value. In one possible implementation, bit field 64 of MMCR0 54 is set to enable counting by PMC2 52, and bit field 62 is set to select a particular reason field value as the event for which occurrences are counted by PMC2 52. (Of course, any other monitorable event such as data cache misses could alternatively be selected.) In addition, bit field 66 is set so that a performance monitor interrupt (PMI) is signalled in response to PMC2 52 becoming negative. The process then proceeds from block 122 to block 124, which depicts setting PMC2 52 to an initial value through the execution of a second MTSPR instruction having PMC2 52 as a target. In this way, the number of occurrences of the specified reason field value (or other selected event) that are detected prior to performance monitor 50 signalling a PMI may be selectively determined. For example, if machine state data is desired at each occurrence of the specified reason field value, PMC2 52 is initialized to EFFFFFFFh. On the other hand, if data descriptive of only one out of every 16 occurrences of the specified reason field value is desired, PMC2 52 is initialized to EFFFFFF1h. Following block 124, the process proceeds to block 126.

Block 126 illustrates the execution of a test program (e.g., a commercial benchmark) in the manner described above with reference to FIG. 1. In response to an occurrence of the selected event (i.e., the setting of one of reason fields 106 to the specified reason code), PMC2 54 is incremented. As indicated by blocks 128 and 134, if the incrementation of PMC2 52 does not cause a PMI to be signalled prior to the completion of the test program, the process passes to block 136 and terminates. However, if during execution of the test program a PMI is signalled in response to PMC2 52 becoming negative, the process proceeds from block 128 to block 130. Block 130 illustrates the storage of the machine state of processor 10 for subsequent compilation and analysis. In order to ensure that there is no loss of machine state data due to interrupt masking, processor 10 preferably copies the values stored within PFT 100 into an optional shadow PFT 110 when the PMI is signaled. The values can then be held in shadow PFT 110 until PMIs are reenabled. Alternatively, the values within shadow PFT 110 can be updated each cycle and then frozen in response to a PMI being signaled. At the time the PMI is signaled, the effective instruction address and operand address (if any) of "a" current instruction are also captured within saved instruction address register (SIAR) 80 and saved data address register (SDAR) 82, respectively. Thus, regardless of when the PMI is actually serviced, the contents of SIAR 80, SDAR 82, and shadow PFT 110 provide information describing the instructions executing in processor 10 at the time the PMI was signalled. The process then proceeds from block 130 to block 132, which depicts processor 10 servicing the PMI by executing an interrupt handler that preferably copies the values of shadow PFT 110, PMCs 52, SIAR 80, and SDAR 82 to memory 39 and thereafter resets PMC2 52 and reenables PMIs. The process then passes to block 134, which illustrates a determination of whether or not execution of the test program has completed. If not, the test program continues execution as indicated at block 135 and thereafter returns to block 128, which has been described. Alternatively, in response to a determination at block 134 that the test program has completed execution, the process terminates at block 136.

By post processing the captured machine state data, a determination of the types and frequencies of performance bottlenecks may be made with great specificity. For example, by repeatedly sampling the test program according to the method illustrated in FIG. 4, specific "hot spot" addresses that are associated with particular pipeline blockages can be identified. Because the specific causes of the pipeline blockages at these addresses can be easily identified by one or more (and probably multiple) reason fields within the pipeline flow table, a software engineer or hardware designer can readily determine what modifications to the code and/or processor hardware can be made to optimize data processing system performance.

As has been described, the present invention provides an improved method and system for tracking the progress of instructions within the execution pipeline of a processor. In contrast to conventional processor performance monitors that provide only event counts for selected events, the present invention dynamically indicates an instruction status, reason code, and cycle count for each instruction in order to provide a comprehensive picture of the instruction pipeline.

While the invention has been particularly shown and described with reference to an illustrative embodiment, it should be understood by those skilled in the art that various changes in form and detail may be made therein without departing from the spirit and scope of the invention. For example, although the present invention has been described with respect to an illustrative embodiment in which a pipeline flow table (PFT) is incorporated within the performance monitor of a processor, in an alternative embodiment PFT 100 can be implemented as a portion of reorder buffer 9 within completion unit 8. In this embodiment, each entry of the PFT would also include a field for indicating whether the instruction generated an exception and a flag for indicating that the instruction had entered the completion stage.

What is claimed is:

1. A processor, comprising:
    at least one execution unit that executes instructions; and
    an instruction status indicator that dynamically indicates a status of an instruction during processing, said instruction status indicator having at least a first state, wherein said instruction status indicator is set to said first state to indicate that execution of said instruction is stalled.

2. The processor of claim 1, wherein said instruction status indicator is a first instruction status indicator and said processor further comprises at least a second instruction status indicator, wherein said first instruction status indicator and said second instruction status indicator are each associated with a respective unique instruction identifier.

3. The processor of claim 1, and further comprising a reason code indicator associated with said instruction status indicator, wherein said reason code indicator specifies an event for which an occurrence resulted in said status indicated by said instruction status indicator.

4. The processor of claim 1, and further comprising a history buffer associated with said instruction status indicator, said history buffer indicating a number of processor cycles that said status indicated by said instruction status indicator has remained unchanged.

5. The processor of claim 1, and further comprising a history buffer associated with said instruction status indicator, said history buffer indicating a number of processor cycles occurring since processing of said instruction began.

6. The processor of claim 1, and further comprising a performance monitor containing said instruction status indicator.

7. The processor of claim 6, said performance monitor including an event counter that increments in response to an occurrence of a specified instruction status.

8. The processor of claim 1, and further comprising a completion buffer having a plurality of entries, wherein said instruction status indicator forms at least a portion of one of said plurality of entries within said completion buffer.

9. The processor of claim 1, and further comprising a shadow instruction status indicator that stores said status indicated by said instruction status indicator in response to an interrupt.

10. The processor of claim 1, said processor having an instruction pipeline including a plurality of stages, said instruction status indicator having a second state to which said instruction status indicator is set in response to completion of processing of said instruction at a current stage among said plurality of stages.

11. The processor of claim 10, said instruction status indicator having a second state that indicates that processing of said instruction at said current stage is continuing.

12. A method of tracking instruction execution within a processor, said method comprising:
    setting an instruction status indicator within said processor to dynamically indicate a status of an instruction during processing, said instruction status indicator having at least a first state, wherein said instruction status indicator is set to said first state to indicate that execution of said instruction is stalled.

13. The method of claim 12, wherein said instruction status indicator is a first instruction status indicator and said processor further includes at least a second instruction status indicator, said method further comprising the step of associating a unique instruction identifier with each respective one of said first instruction status indicator and said second instruction status indicator.

14. The method of claim 12, and further comprising the step of setting a reason code indicator associated with said instruction status indicator, said reason code indicator specifying an event for which an occurrence resulted in said status indicated by said instruction status indicator.

15. The method of claim 12, and further comprising the step of setting a history buffer associated with said instruction status indicator to indicate a number of method cycles that said status indicated by said instruction status indicator has remained unchanged.

16. The method of claim 12, and further comprising the step of setting a history buffer associated with said instruction status indicator to indicate a number of processor cycles occurring since processing of said instruction began.

17. The method of claim 12, wherein said processor further comprises a completion buffer including a plurality of entries, wherein said step of setting an instruction status indicator comprises the step of storing a status in one of said plurality of entries in said completion buffer.

18. The method of claim 12, and further comprising the step of incrementing an event counter within said processor in response to an occurrence of a specified instruction status.

19. The method of claim 12, said processor further including a shadow instruction status register, said method further comprising the step of storing said status indicated by said instruction status indicator within said shadow instruction status register in response to an interrupt.

20. The method of claim 12, said processor having an instruction pipeline including a plurality of stages, wherein said step of setting said instruction status indicator comprises the step of setting said instruction status indicator to a second state in response to completion of processing of said instruction at a current stage among said plurality of stages.

21. The method of claim 12, said processor having an instruction pipeline including a plurality of stages, wherein said step of setting said instruction status indicator comprises the step of setting said instruction status indicator to a second state to indicate that processing of said instruction at a current stage among said plurality of stages is continuing.

* * * * *